United States Patent Office 2,894,913
Patented July 14, 1959

2,894,913

ANTIFOAM EMULSION

Robert E. Sullivan, Bay City, and William T. Gregory, Midland, Mich., assignors to Dow Corning Corporation, Midland, Mich., a corporation of Michigan No Drawing. Application February 20, 1958
Serial No. 716,261

2 Claims. (Cl. 252—358)

This invention relates to silicone antifoam emulsions employing methylcellulose as the sole emulsifying agent.

Silicone antifoam agents and emulsions thereof are now well known in the art as shown in United States Patents No. 2,632,736 and No. 2,595,928. They generally employ a siloxane fluid or gum with a small amount of silica filler for antifoaming properties. Up to the present time numerous emulsifying agents have been employed including cationic agents such as quaternary ammonium compounds, anionic agents such as sodium lauryl sulfate, and nonionic compounds such as polyoxyethylene sorbitan monostearate. Preferred in the emulsions were such nontoxic agents as glycerol monostearate and polyoxyethylene monostearate. These compounds were used where the ultimate product from the process requiring an antifoam was a foodsuff.

Oftentimes in these various emulsions methylcellulose was employed as a stabilizer. However, methylcellulose was known to be a foaming agent in water and, therefore, was used only in very small quantities. It is, therefore, surprising to discover that methylcellulose, by itself, is an effective emulsifying agent.

It is, therefore, an object of this invention to provide a stable emulsion which will prevent foaming of aqueous systems. Another object is to provide an antifoam composition which can be employed in conjunction with food products.

These objects are accomplished with the oil-in-water type emulsion of this invention consisting essentially of (1) from 0.5 to 50% by weight based on the weight of the emulsion of a benzene-soluble methylpolysiloxane of at least 50 cps. viscosity at 25° C. containing from 2 to 10% by weight of the siloxane of a silica or carbon black filler having a particle size no greater than two microns, (2) water and (3) from .03 to 6.5% by weight based on the weight of the water of a methylcellulose having a viscosity of at least 400 cps. at 25° C. as measured in a 2% by weight solution in water.

The siloxanes employed herein are benzene-soluble methylpolysiloxanes preferably containing from 1.9 to 2.1 methyl radicals per silicon. The siloxane must have a sufficiently high molecular weight to have a viscosity of at least 50 cps. at 25° C. and can be non-flowing gums. In the case of such gums a solvent such as benzene or toluene can be added to aid in dispersion of the siloxane by reducing the viscosity of the combination. These siloxanes may be endblocked by trimethylsiloxy groups or hydroxyl radicals.

The emulsion can contain up to 50% by weight siloxane but will be an effective antifoaming emulsion with as little as 0.5% by weight siloxane present.

For the purpose of this invention any silica or carbon black filler with a particle size no greater than two microns is operative. The preferred maximum size, however, is 100 millimicrons. However, it is necessary that from 2 to 10 percent by weight of the filler be incorporated into the siloxane with a preferred range of from 3 to 7 percent.

The methylcellulose employed in this invention is essentially the dimethyl ether of cellulose containing from 27.5 to 32.0% by weight methoxyl groups. It is necessary that this methylcellulose be sufficiently polymerized that a 2% by weight solution in water has a viscosity of at least 400 cps. at 25° C. If the methylcellulose falls below this viscosity limitation, it becomes too oil-soluble and will not act as an emulsifying agent. In order to properly govern the viscosity of the emulsion, the proportion of methylcellulose in the emulsion has been made dependent on the water present rather than the total emulsion. If the portion of methylcellulose is above the limitation stated, the resultant emulsion will become so viscous as to be unmanageable. On the other hand, if the methylcellulose concentration falls below the minimum disclosed, the ratio of methylcellulose to siloxane will be too low to give a satisfactory emulsion. The methylcellulose can be used as a stabilizer when added in excess of the amount necessary for emulsifying the mixture. It is effective as an emulsifying agent in generally lower concentrations than the previously employed stearyl derivatives.

These emulsions can be prepared by various methods. The methylcellulose can be wetted with hot water, slurried into a small amount of alcohol or propylene glycol, dispersed in cold water with a wetting agent or slurried in the siloxane. Once the methylcellulose is wetted, it can be subsequently easily dispersed in cold water. A mixture of the components can also be milled in a colloid mill to produce an emulsion. There is nothing critical in the order of mixing of the ingredients of this emulsion, but it is more efficient to wet the methylcellulose prior to mixing the ingredients together.

These emulsions can also contain additives such as pigments, rust inhibitors, antioxidants, and such special additives as sorbic acid which will prevent mold growth in the emulsion.

U.S.P. grade methylcellulose, after extensive toxicological investigation, has been shown to be entirely safe for use around food products. While the emulsion of this invention is useful for defoaming any aqueous system agitated by pumping or by "boiling down," it is especially useful for use in the processing of food stuffs.

The following examples are illustrative and are not intended to limit this invention which is properly set out in the claims.

*Example 1*

30 parts by weight of (1) a mixture consisting of 60 parts by weight of a trimethylsiloxy-endblocked dimethylpolysiloxane fluid having a viscosity of 350 cps. at 25° C., 40 parts by weight of a sulfuric acid polymerized trimethylsiloxy-endblocked dimethylpolysiloxane having a viscosity of 500 cps. at 25° C. and 5 parts of a synthetic silica with a particle size of approximately 50 millimicrons were mixed with (2) 1.6 parts by weight of methylcellulose, (3) 68.325 parts water and .075 part by weight sorbic acid were milled on a colloid mill at 25° C. An oil-in-water type emulsion was formed having a specific gravity of .992 and a pH of 3.4. The sorbic acid acts only as a fungicide and is unnecessary to the emulsion.

Two aqueous solutions were prepared. One (A) contained 0.1% by weight of polyoxyethylene sorbitan monooleate and the other (B) contained 0.1% by weight of an alkyltrimethylammonium chloride in which the alkyl groups were hexadecyl, octadecyl, octadecenyl and octadecadienyl in a mol ratio of 10:10:35:45. The solutions were agitated and foamed by continuously bubbling air through them. The foams were broken by adding 83 parts per million of the above emulsion to solution (A) and 150 parts per millon to solution (B).

*Example 2*

40 parts by weight of mixture (1) of Example 1, 1.5 parts by weight methylcellulose, 58.425 parts by weight water and .075 part by weight sorbic acid were mixed and milled on a colloid mill at 25° C. An oil-in-water type emulsion resulted having a specific gravity of .928 and a pH of 3.0. This emulsion was satisfactory for defoaming aqueous systems.

*Example 3*

When a mixture of 100 parts by weight of a hydroxyl-endblocked dimethylpolysiloxane fluid having a viscosity of 350 cps. at 25° C. and 7 parts of the silica employed in Example 1 is substituted for the mixture (1) in Example 1, a similar stable antifoam emulsion is produced.

*Example 4*

When a mixture of 100 parts by weight of trimethylsiloxy-endblocked dimethylpolysiloxane having a viscosity of 10,000,000 cps. at 25° C. and thinned with toluene to a viscosity of 100,000 cps. at 25° C. and 3 parts of the silica employed in Example 1 is substituted for the mixture (1) in Example 1, similar stable emulsion is produced.

*Example 5*

When carbon black having a particle size of no more than 100 millimicrons is substituted for the synthetic silica in Example (1), an emulsion is produced which is satisfactory for defoaming aqueous systems.

That which is claimed is:

1. An oil-in-water type emulsion consisting essentially of (1) from 0.5 to 50% by weight based on the weight of the emulsion of a benzene-soluble methylpolysiloxane of at least 50 cps. viscosity at 25° C. containing from 2 to 10% by weight of a filler selected from the group consisting of silica and carbon black and having a particle size no greater than two microns, (2) water and (3) from .03 to 6.5% by weight based on the weight of the water of methylcellulose having a viscosity of at least 400 cps. at 25° C. as measured in a 2% by weight solution in water.

2. The emulsion of claim 1 wherein the filler is a silica filler having a particle size no greater than 100 millimicrons.

References Cited in the file of this patent

UNITED STATES PATENTS

| | | |
|---|---|---|
| 2,595,928 | Currie et al. | May 6, 1952 |
| 2,632,736 | Currie | Mar. 24, 1953 |

FOREIGN PATENTS

| | | |
|---|---|---|
| 883,589 | Germany | July 20, 1953 |